United States Patent Office 3,573,230
Patented Mar. 30, 1971

3,573,230
ELECTRICALLY CONDUCTIVE, LOW FRICTION FLUOROCARBON POLYMER COATING METHOD
Alexander J. Van Voorhees, Port Huron, Mich., assignor to Acheson Industries, Inc., Port Huron, Mich.
No Drawing. Filed Oct. 16, 1968, Ser. No. 779,291
Int. Cl. H01b 1/02; B44d 1/02
U.S. Cl. 252—514
19 Claims

ABSTRACT OF THE DISCLOSURE

A method of forming an electrically conductive, high lubricity, fluorocarbon polymer (e.g., polytetrafluoroethylene) containing, adherent coating on a substrate; and coating composition.

BACKGROUND OF THE INVENTION

This invention broadly relates to a method of forming an electrically conductive adherent coating on a substrate with the coating containing a substantial amount of fluorocarbon polymer to provide the coating with excellent low friction surface characteristics. More particularly, the invention also relates to a specific coating composition for use in carrying out the method of forming electrically conductive low friction coatings as well as an aerosol form of the coating composition suitable for aerosol application.

In the past, attempts have been made without success to provide tenacious, strongly adhering, surface coatings which would be electrically conductive and at the same time be of high lubricity, that is, a low friction surface coating with electrically conductive properties.

The state of the prior art patents known to the applicant at the time of filing the application is set forth as follows: U.S. Pats. 3,102,990; 2,823,146; 2,730,597; 3,243,753; 3,224,966; 2,744,988; 2,866,764; 2,878,353; 2,954,476; 3,257,317; 2,998,840; 2,403,657; 2,754,168; 3,155,441; 3,194,860 and 3,273,977; British Pats. 1,106,706; 779,243 and 837,198.

Certain of the aforementioned patent references disclose molding compounds which are electrically conductive in nature and which, to a certain extent, may be considered to have low friction characteristics; however, neither these patent references nor the molding compound disclosures thereof disclose a manner of making a tenacious, adherent electrically conductive low friction surface coating, and it was with this problem in mind that I made the discovery of the invention disclosed hereinafter.

It should also be understood that in prior art low friction surface coatings generally similar to those disclosed herein there was no way of rendering such coatings into a condition such that they would possess good electrical conductance properties. Furthermore, any attempts to change these prior art low friction surface coatings such that they would possess good electrical conductance properties as far as is known led to adhesion problems with the resultant coatings formed; and also is led to what may be termed lubricity problems in that in the past it was generally considered that the formation of low friction surface coatings which would possess the necessary property of acceptable adherency to the substrate would necessarily and at the same time be incompatible with the obtaining of the proper low friction characteristics and electrical conductivity.

Accordingly, in view of the above, it is a primary object of the present invention to provide a method of forming an electrically conductive, high lubricity, wear resistant, adherent coating on a substrate.

Another object of the present invention is to provide a unique and improved coating composition suitable for carrying out the method of forming said adherent coating.

Another more specific object of the present invention is to provide a method of forming an electrically conductive, high lubricity, wear resistant, adherent coating on a substrate, which coating is formed from a composition containing a fluorocarbon polymer such as polytetrafluoroethylene, a substantial amount of conductor particles of silver, and a thermosetting or thermoplastic binder resin, preferably a phenolic resin.

Still another object of the present invention is to provide an aerosol composition suitable for carrying out the method herein of forming an electrically conductive, high lubricity, fluorocarbon polymer containing adherent coating; and, the technique of aerosolizing said aerosol composition to form coatings therewith.

Other objects, features and advantages of the present invention will become apparent from the subsequent description and the appended claims.

SUMMARY OF THE INVENTION

It has been discovered that the above and related objects are satisfied and a tenacious, adherent coating having electrically conductive and high lubricity or low friction characteristics is provided by a coating composition falling within the specifically delineated limitations set forth hereinafter. It has been found that if the disclosure and teachings hereinafter set forth with respect to the method of forming adherent coatings utilizing the coating composition herein are not followed then unsatisfactory and unacceptable electrically conductive coatings will result.

Briefly stated, the present invention comprises a method of forming an electrically conductive, high lubricity, fluorocarbon polymer containing, adherent coating on a substrate, comprising the steps of: (A) applying to the substrate a composition comprised of about 5% to about 80% by weight total solids in a solvent, said solids containing (1) about ½% to about 65% by weight fluorocarbon polymer in finely divided form, (2) about 5% to about 95% by weight conductor particles substantially of silver in finely divided form, and (3) about 3% to about 90% binder, said binder being selected from the group consisting of a thermosetting resin or a thermoplastic resin, said resin being different from said polymer, and (B) drying said composition to form the adherent coating on the substrate.

In another aspect the present invention comprises a coating composition as described in the method immediately set forth above; and, also a pressurized container containing an aerosol composition form of the coating for use in an aerosol application method to form electrically conductive, high lubricity adherent surface coatings.

DESCRIPTION OF PREFERRED EMBODIMENTS

The coating composition for use in carrying out the method herein is that generally formed by intermixing the components of the coating composition together and by this it is meant that the fluorocarbon polymer, the conductor particles, and the binder resin, usually with approximately half the amount of solvent to be used, are all blended together thoroughly to form the coating composition; and, the additional solvent is added to the coating composition in order to bring the coating composition to a particular desired percent total solids.

The method of application of the coating composition to a substrate is preferably carried out by spraying and the coating applied by spraying produces what may generally be termed a silver colored coating having high lubricity properties and at the same time being electrically conductive. The coating composition may also be applied by dip coating, brushing or the like.

After the coating composition has been applied to the substrate, the coating is allowed to dry in order to form the final adherent coating on the substrate. The time period for the drying is not critical, however, in general, it may be stated that the time period of drying should be carried out to an extent sufficient and compatible with drying or final setting up the particular binding resin used in the composition. Generally, it may be stated that the coating composition should be allowed to dry for at least 15 minutes and preferably the drying should be allowed to take place for at least one to two hours or more before making use of the coating formed. Still further, the drying may be carried out at elevated temperatures (in the range of about 200° F. to about 500° F.) or at room temperature, dependent upon whether the binder resin used requires elevated temperature curing, or is of the resin type which is suitable for being air dried or the like.

By the term "fluorocarbon polymer" as used herein, it is meant a polymer selected from the group consisting of polymers of fluorinated and fluoro-chlorinated olefins and copolymers of two or more of the said olefins having a molecular weight generally within the range of about 500 up to as high as 10,000,000 or more. Said fluorocarbon polymers should generally be in finely divided form; and, more particularly, from a preferred standpoint the fluorocarbon polymer used in the coating composition herein should have a particle size of about 44 microns or less (that is, less than about 325 mesh U.S. Standard screen size), with best results having been obtained with the fluorocarbon polymer having a particle size of less than about 10 microns. Such fluorocarbon polymers as described above are formed by methods now known to those skilled in the art by polymerization from olefin monomers. Fluorocarbon polymer materials suitable for use herein may generally be made in accordance with the procedures described in U.S. Pats. 2,534,058; 2,478,229 and 3,067,262.

The conductor particle material described for use herein should generally be a finely divided or particulate material consisting essentially of silver. By this it is meant that essentially completely pure finely divided silver may be used in the invention herein or silver-plated copper particles may also be used herein. It has been found that copper particles per se are generally unsatisfactory for the reason that the copper particles oxidize (during aging of the coating composition) and this leads to poor electrical conductance properties in the finally deposited adherent coating.

The particle size of the conductor particles must be kept at a very finely divided level in order to get good wear properties in the deposited coating. From a broad standpoint the conduct or particles should have a particle size such that the particles or flake material will pass through a 100 mesh screen (U.S.S. screen size). From a preferred standpoint the conductor particles should pass through a 325 mesh screen, that is, have a particle size of less than about 44 microns.

It should be understood that the specific gravity of silver is so high that it is possible to use a high weight percent of silver without being too high on the volume content of the silver in the finally deposited coating.

The binder or binder resin described for use herein is intended to be meant in its normally understood sense and in particular the binder material suitable for use herein is either a thermosetting resin or a thermoplastic resin. It is preferred however that a thermosetting resin be used herein.

The terms "thermosettable" resins and "thermosetting" resins as used herein and in the appended claims are all intended in their normally understood sense to include all of the classes of specific resins, modified and unmodified, and compatible admixtures thereof, which harden or cure into a permanent shape when heated or oxidized. This specifically includes classes broadly designated the phenolic resins, the epoxy resins, the alkyd resins, the polyurethane resins, the amino resins, i.e. urea, melamine and triazine resins, the thermosetting silicone resins and the thermosetting acrylic resins.

Phenolic resins which can be used satisfactorily include the condensation products of phenol or substituted phenols, such as cresol, resorcinol or butylphenol with aldehydes, such as formaldehyde, furfural, etc., and phenolic resins which have been modified with, for example, rosins, rosin esters, alkyds, etc.

The urea formaldehyde resins are the condensation products of urea and formaldehyde or its polymers and the melamine resins are the condensation products of melamine and formaldehyde.

Alkyd resins include both the saturated and unsaturated esters and polyesters of polybasic acids and polyhydric alcohols, such for example, as the esters of maleic, fumaric, phthalic, or adipic acid, etc., and a glycol, glycerol, sorbitol, etc. These resins may be modified with phenolics, various drying or semi-drying oils, etc.

The epoxy resins broadly include the condensation products of the reaction of epichlorohydrin and bisphenols or bifunctional hydroxyl-containing compounds. These polymers can be modified satisfactorily with polyester resins, the phenolic resins, certain fatty acids and the like. The polyurethane resinous materials are the interreaction products of a polyester or polyether and an isocyanate chosen to cure to a solid thermoset film and preferably are the product of interreacting a saturated polyester and a 2-4-toluene di-isocyanate and its derivatives.

The suitable silicone resins are the thermosetting alkyl silicones such as methyl silicone having a $CH_3$ to silicone ratio between about 1.2 and 1.5 or the ethyl silicones having an ethyl group to silicone ratio between about 0.5 and about 1.5, or the alkyl-aryl silicones containing selected quantities of alkyl and aryl groups to give good adhesive and strength properties, such as methylphenyl silicone having about equal proportions of methyl and phenyl groups and a ratio to silicone of about 1.8. The silicone oils and greases are not usable for the purposes of this invention.

The compositions of this invention may also contain other ingredients, such as conventional fillers, coloring agents, driers, and the like, so long as the quantity thereof does not prevent the thermosettable resins upon curing from forming a strong bond both to the surface of the substrate and to the fluorocarbon polymer particles distributed therein, and does not destroy the lubricant or conductive character of the coating.

The fluorocarbon particles of this invention when held to the substrate by the thermosetting resin or the thermoplastic resin as the discontinuous phase in the continuous resin phase function extremely satisfactorily as solid lubricant particles and these particles are firmly anchored and remain in place in a variety of low friction applications. It is also possible to incorporate small amounts of other lubricating particles in the coatings formed in accordance with this invention.

The term "thermoplastic resin" as used herein and in the appended claims is intended in its normally understood sense. More specifically, it is intended to include all of the classes of specific resins, modified and unmodified, and compatible admixtures thereof. This broadly includes the thermoplastic resins or mixtures thereof from the group of the cellulosic resins, the vinyl resins, the acrylic resins, the polyamides, and the hydrocarbon resins.

The cellulosic resins include all the cellulosic ester and ether resins which are soluble in substantially anhydrous organic solvents. Suitable cellulose esters include cellulose acetate, cellulose acetate butyrate, cellulose acetate propionate, cellulose triacetate, cellulose propionate and nitrocellulose; and, suitable cellulose ethers include ethyl cellulose, ethyl hydroxy ethyl cellulose, carboxy ethyl cellulose, hydroxyl propylmethyl cellulose, and carboxy methyl hydroxyethyl cellulose. Mixtures of the cellulose esters or cellulose ethers can be used and, in certain cases, mixtures are more desirable than a single ester or ether, since certain mixtures produce degrees of adhesion and variations and flexibility that are not obtainable by the use of a single cellulosic resin. Of these resins nitrocellulose is preferred, while the preferred cellulose ether is ethyl cellulose.

The vinyl resins include polyvinyl acetate, polyvinyl acetals, polyvinyl alcohols, polyvinyl butyral, and vinyl copolymers. The most useful vinyl resins are the copolymers, which have good solubility in organic solvents and desirable film forming properties, and of these the copolymers of polyvinyl chloride and polyvinyl acetate are the most useful.

The acrylic resins useful in this invention are the organic solvent soluble polymers and copolymers of acrylic acid, substituted acrylic acid, and methacrylic acid, including the salts and esters of these acids.

The hydrocarbon resins referred to are the petroleum resins produced by polymerization of unsaturates derived during the catalytic distillation of crude petroleum and are intended to encompass the polyterpene resins.

With respect to both the thermosetting resins and the thermoplastic resins described herein it should be understood that it is intended to include all of those resins which are capable of being applied to the substrate from aerosol containers as well as by more normal application methods such as spraying, brushing or dipping.

The solvent or dispersion medium for use in the compositions of this invention generally function to dissolve the resin and to form a liquid dispersion of the fluorocarbon polymer particles, and the conductor particles, with the dispersion being of the desired consistency to enable easy application to the surface to be coated, such as, for example, by spraying, atomizing, brushing, dipping, aerosolizing, or the like. The solvent or dispersing medium must be incapable of dissolving the fluorocarbon polymer. Inasmuch as the fluorocarbon polymers of this invention are insoluble in most organic solvents, any of the common aliphatic and aromatic hydrocarbons, ethers, esters, ketones, alcohols, chlorocarbons, etc., function satisfactorily as the solvent portion of the coating composition and method described herein. The best solvent for any specific formulation may be selected on the basis of its ability to dissolve the selected thermosettable resin or thermoplastic resin, and compatibility with the other components of the coating medium. While organic solvents represent the preferred materials for use as the entire dispersing media, particularly in the spray and pressurized container forms of this invention, water may be present in the combination with the organic solvent, however, water may be present in small amounts only. It is also appropriate to use water miscible organic solvents in this invention.

Generally, in the aerosol forms of the invention described herein water is kept at a very low level or preferably the aerosol compositions herein are substantially water free. While it is possible to use a single organic solvent as a dispersing medium, in most cases it is preferable to use a blend of organic solvents to obtain the optimum physical characteristics, such as application ease, controlled volatility, etc.

Organic solvents and solvent blends which are generally suitable for use in forming the dispersing medium with the phenolic resins of this invention include the alcohols, esters, aromatic hydrocarbons, and ketones. Specific solvents which have been successfully used have included one or more of the following, n-butyl alcohol, toluene, methyl isobutyl ketone, ethylene glycol, monoethyl ether acetate and amyl acetate. Organic solvents and solvent blends generally useful in forming the dispersing medium with the urea formaldehyde resins include the alcohols, aromatic hydrocarbons, and ketones. Specific solvents of these classes that are satisfactory include one or more of n-butyl alcohol, toluene, xylene, ethylene glycol, monoethyl acetate and methyl isobutyl ketone.

Organic solvents and solvent blends for use with the alkyd resins include, in general, the aliphatic and aromatic hydrocarbons. Specific hydrocarbon solvent successfully used in this invention have included one or more of xylene, toluene and mineral spirits.

The epoxy resins are soluble broadly stated, in the alcohols, esters, glycols, aromatic hydrocarbons and the ketones. Specific organic solvents and solvent blends of this invention which are satisfactory include one or more of n-butyl alcohol, ethylene glycol monoethyl ether acetate, toluene, methyl isobutyl ketone and xylene.

Organic solvents and solvent blends generally useful as the dispersion medium with the polyurethane coating resin include the esters, ketones and aromatic hydrocarbons.

The thermosetting silicone resins are soluble in the esters, ketones, chlorinated hydrocarbons, aromatic hydrocarbons and, aliphatic hydrocarbons.

Thermosetting acrylic resins are generally soluble in the ketones and aromatic hydrocarbons, and specific solvents and solvent blends which are satisfactory to form the compositions of this invention include at least one of n-butyl alcohol, toluene, xylene, or the like.

Solvents which are suitable for use with the cellulose ethers include the alcohols, such as ethanols, propanol, butanol, etc.; esters such as ethyl acetate and butyl acetate; hydrocarbons such as benzene, toluene, xylene and heptane and ketones such as acetone. The glycols may also be used, such as ethylene glycol, hexylene glycol, ethylene glycol monoethyl ether, diethylene glycol, the ethers of diethylene glycol, etc. It is also suitable to employ halogenated hydrocarbons, such as ethylene dichloride, methylene chloride, carbontetrachloride, etc.

For cellulose acetate propionate, typically suitable solvents include acetone dioxane, methylene chloride, cyclohexanone, methyl acetate, etc. For cellulose triacetate, typically suitable solvents include dioxane, methylene chloride, nitropropane, chloroform and mixtures of ethylene chloride and methyl alcohol, etc. For cellulose propionate typically suitable solvents include butyl acetate, ethyl acetate, tetrahydrofurane, etc. For nitrocellulose, typically suitable solvents include methyl isobutyl ketone, buty acetate, ethyl acetate, amyl acetate, etc. It is also desirable to employ in the compositions diluent to reduce the viscosity of the composition to the desired level and diluents which are suitable for this purpose include, for example, toluene, xylene, heptane, mineral spirits, ethyl alcohol, isopropyl alcohol, and butyl alcohol.

Solvents generally suitable for use with the vinyl resins include ketones, aromatic hydrocarbons, esters, and nitrohydrocarbons. Commercially available specific solvents which fall in these general categories and which may be used satisfactorily in the compositions of this invention include toluene, ethylene glycol monoethyl ether, methyl isobutyl ketone, and cyclohexanone, methyl alcohol, ethyl acetate and tetrahydrofuran.

Solvents generally useful with the acrylic resins include the chlorinated hydrocarbons, aromatic hydrocarbons, esters, and ketones, and specific solvents in these categories which have been found to be satisfactory include toluene, methyl isobutyl ketone, acetone, and ethylene glycol monoethyl ether.

The compositions of this invention as already mentioned are preferably applied to the substrate to be coated by atomizing or spraying from conventional spray gun equipment, air brushes, or from pressurized aerosol containers. The coatings of this invention are applied in relatively thin layers and where a relatively thick total coating is desired the coating is preferably built up by applying thin, multiple layers and allowing them to air dry between applications. For most applications a coating having a thickness in the range of about 0.1 to about 4 mils provides the most satisfactory overall characteristics. A preferred coating thickness is one within the range of about 0.3 to about 0.8 mil.

The broad weight percent limits describing the coating composition in accordance with this invention are set forth below in Table 1, with the percentage figures being given as approximate values.

TABLE 1 (PERCENT BY WEIGHT)

(1) Fluorocarbon polymer particles—½%–65% of composition
(2) Conductor particles or material (silver or silver plated copper)—5%–95% of composition
(3) Binder resin material—3%–90% of composition
(4) Total solids content of composition—5%–80%
(5) Solvent material content of composition—20%–95%

The preferred composition ranges for the coating composition in accordance with this invention are set forth below in Table 2, with the numerical figures given being as approximate values.

TABLE 2 (PERCENT BY WEIGHT)

(1) Fluorocarbon polymer particles—1½%–40% of composition
(2) Conductor particles or material (silver or silver plated copper)—10%–60% of composition
(3) Binder resin material—5%–40% of composition
(4) Total solids content of composition—25%–65%
(5) Solvent material content of composition—75%–35%

The coating compositions of this invention may be packaged into and dispensed from internally pressurized spray containers (commonly called aerosols, aerosol bombs or aerosol containers), and it is important that the organic solvents for the binder resins be compatible with the propellant material used to aerosolize the composition.

The specific propellant used in producing the aerosol composition, adapted for application from an aerosol container, is not critical to the performance of this invention, provided the propellant and organic solvent are compatible. Those propellants satisfactory for use in the invention are the chlorinated hydrocarbon gases such as those designated by the trade name Freon; non-liquefied gases such as nitrogen, halogenated compounds such as methylene chloride, and hydracorbons such as propane, isobutane and the like. The most useful propellant materials are those from the group of the fluorochloro haloalkane derivatives of methane and ethane; that is, for example, dichlorodifluoromethane (Freon 12), trichloromonofluoromethane (Freon 11), and dichlorotetrafluoroethane. The preferred control valve for use on the aerosol pressurized containers are those known in the aerosol industry as paint valves. Suitable concentration ranges for the aerosol composition and packaging thereof including propellant material is between about ⅕% and about 25% by weight total solids and preferably it is between about 1% and about 10%.

Relative quantities of resin solids, fluorocarbon polymer solids, and conductor particle solids may vary over a relatively wide range (as shown above in Tables 1 and 2) depending upon the specific requirements of the particular application for the electrically conductive coatings described herein. Variation of the fluorocarbon polymer solids, the binder resin solids and the conductor particle material within the above given ranges in Tables 1 and 2 produce variations in the ultimate coefficient of friction, electrical conductivity, adhesion, impact resistance, flexibility and wear life of the coating which is formed, and it will be understood that the optimum relative proportion of each particular material can be established by tests under the specific conditions of use when the final application for the electrically conductive coating described herein is known.

By the term "aerosol composition" as used herein, it is meant a composition used in a pressurized container, aerosol bomb, aerosol container, or the like and which composition can be sprayed or aerosolized from the container to form a coating on the substrate. By the term "aerosolizing" it is meant spraying aerosol composition from its container.

In order to further illustrate the invention, the following examples are included for illustrative purposes and are not intended to be limiting of the scope of the invention as set forth in the subjoined claims.

| Example No. | Percent weight | | | Percent total solids by wgt. | Solvent | Electrical resistance of deposited coating, ohms per square |
|---|---|---|---|---|---|---|
| | Silver particle material (≈325 mesh) | Fluorocarbon polymer | Binder resin solids | | | |
| 1 | 20.0 | 7.4 (Vydax-AR) | 6.5 (Union Carbide, phenolic resin, BKS-2600). | 33.9 | Acetone-ethanol Freon TF. | 0.20 |
| 2 | 25.0 | 4.3 (Vydax-AR) | 8.1 (Union Carbide, phenolic resin, BKS-2600). | 37.4 | do | 0.09 |
| 3 | 30.0 | 9.8 (Whitcon-8) | 9.8 (Union Carbide, phenolic resin, BKS-2600). | 49.6 | Acetone-ethanol | 0.10 |
| 4 | 28.7 | do | 9.3 (Union Carbide, phenolic resin, BKS-2600). | 47.8 | do | 0.28 |
| 5 | 29.6 | 6.8 (Whitcon-8) | 9.6 (Union Carbide, phenolic resin, BKS-2600). | 46.0 | do | 0.09 |
| 6 | 31.8 | 3.2 (Vydax-AR) | 3.2 (91% polyvinyl chloride-3% polyvinyl acetate copolymer: with 5.9% hydroxyl value; 1.39 specific gravity—Union Carbide VAGH). | 38.2 | Methyl-isobutyl ketone; Freon TF. | 0.18 |
| 7 | 34.6 | 1.7 (Vydax-AR) | 3.5 (91% polyvinyl chloride-3% polyvinyl acetate copolymer: with 5.9% hydroxyl value; 1.39 specific gravity—Union Carbide VAGH). | 39.8 | MIBK-Freon TF | 0.13 |
| 8 | 36.4 | 3.7 (Whitcon-8) | 3.6 (91% polyvinyl chloride-3% polyvinyl acetate copolymer: with 5.9% hydroxyl value; 1.39 specific gravity—Union Carbide VAGH). | 43.7 | MIBK | 0.18 |
| 9 | 37.1 | 1.9 (Whitcon-8) | 3.7 (91% polyvinyl chloride-3% polyvinyl acetate copolymer: with 5.9% hydroxyl value; 1.39 specific gravity—Union Carbide VAGH). | 42.7 | MIBK | 0.19 |
| 10 | 37.4 | 1.0 (Whitcon-8) | do | 42.1 | MIBK | 0.17 |
| 11 | 21.6 | 31.5 (Teflon-7) | 7.00 (Union Carbide phenolic resin, BKS-2600). | 60.1 | Acetone ethanol | 0.18 |
| 12 | 30.1 | 5.0 (Teflon-7) | 9.7 (Union Carbide phenolic resin, BKS-2600). | 44.8 | do | 0.19 |
| 13 | 28.6 | 9.8 (Teflon-7) | 9.4 (Union Carbide, phenolic resin, BKS-2600). | 47.8 | do | 0.18 |
| 14 | 38.4 | 6.3 (TL-126)[1] | 12.6 (Union Carbide, phenolic resin, BKS-2600). | 57.3 | do | 0.16 |
| 15 | 31.1 | 10.7 (TL-126)[1] | 10.1 (Union Carbide, phenolic resin, BKS-2600). | 51.9 | do | 0.23 |

[1] Liquid Nitrogen Processing Corp.

In the above examples the material Vydax-AR is a polymer of polytetrafluoroethylene having a molecular weight in the range of about 2000 to about 10,000 and a particle size in the range of about ½ to about 10 microns.

The phenolic resin used in the above examples was Union Carbide Phenolic Resin BKS-2600. This is a phenolic baking resin containing 52–56% non-volatiles in ethanol solvent. The density of this resin is 8.8 pounds per gallon, and the resin has a specific gravity of 1.04–1.06 as supplied in solution form. The viscosity of the resin is 700–1000 cps.

The fluorocarbon polymer entitled Whitcon-8 in the above examples is a polymer of tetrafluoroethylene. Whitcon-8 is a white powder with good lubricating properties. Whitcon-8 has a particle size of less than about 1 micron average particle size per the Fisher-sub sieve size method; it has a specific gravity of 2.16–2.18 and a softening point in excess of 600° F. Whitcon-8 is available from Whitford Chemical Corporation, Westchester, Pa.

The Union Carbide VAGH resin described in the above examples, is a resin copolymer of polyvinyl chloride-polyvinyl acetate containing 91% vinyl chloride, 3% vinyl acetate, and a 5.9% hydroxyl value. Its specific gravity is approximately 1.39.

The fluorocarbon polymer described as Teflon-7 (available from Du Pont Corp.) in the above examples, is a fine powdered form of polytetrafluoroethylene having a particle size in the range of approximately 35 microns or less; and, a specific gravity of about 2.13–2.19.

The fluorocarbon polymer described as TL-126 in the above examples is a polymer of tetrafluoroethylene having an average particle size in the range of about 8-10 microns. TL-126 is available from the Liquid Nitrogen Processing Corporation, Malvern, Pa.

Example 16

The coating composition set forth in Example No. 4 above, was applied to a metal substrate by spraying to form a coating having a thickness of about 1½–2 mils. The coating was then cured for approximately one hour at 390° F. The deposited coating had a value of 0.277 ohm per square electrical conductivity.

The utility of the present invention and the advantages thereof should be fairly apparent from all of the above description. However, in order to be more specific it is here pointed out that the method of forming electrically conductive coatings in accordance with this invention has been found to be extremely advantageous for the preparation of electrically conductive low friction surface coatings on potentiometer contact springs. Also, the invention herein is useful in forming electrically conductive low friction surface coatings of a very tenacious adherent nature on numerous other electrical contact surfaces such as switches of numerous constructions, sliding contacts, etc. It should also be apparent that numerous other applications of this invention will be apparent to those skilled in the art who are seeking a low friction surface coating of a tenacious and highly adherent nature which at the same time has a high electrical conductance.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A method of forming an electrically conductive, high lubricity, fluorocarbon polymer containing, wear resistant, adherent coating on a substrate, comprising the steps of:
   (A) applying to the substrate a composition comprised of about 5% to about 80% by weight total solids in a solvent, said solids containing
      (1) about ½% to about 65% by weight fluorocarbon polymer in finely divided form,
      (2) about 5% to about 95% by weight conductor particles substantially of silver in finely divided form, and
      (3) about 3% to about 90% binder, said binder being selected from the group consisting of a thermosetting resin or a thermoplastic resin, said resin being different from said polymer, and
   (B) drying said composition to form the adherent coating on the substrate.

2. The method of claim 1 wherein
said fluorocarbon polymer is present from about 1½% to about 40% by weight of total solids,
said conductor particles are present from about 10% to about 60% by weight of total solids, and
said binder resin is present from about 5% to about 40% by weight of total solids.

3. The method of claim 1 wherein said binder is a thermosetting resin.

4. The method of claim 1 wherein said binder is a phenolic resin.

5. The method of claim 1 wherein said fluorocarbon polymer has a particle size of minus 325 mesh, and said conductor particles have a particle size of minus 100 mesh.

6. The method of claim 2 wherein said total solids present in the composition is within the range of about 25% to about 65%.

7. The method of claim 1, wherein said fluorocarbon polymer is polytetrafluoroethylene.

8. The coated substrate product by the method of claim 1.

9. The method of claim 1 wherein said fluorocarbon polymer has a particle size of less than about 10 microns, and said conductor particles have a particle size of minus 325 mesh.

10. A coating composition suitable for use in forming electrically conductive, high lubricity, fluorocarbon polymer containing, wear resistant, surface coatings, said composition being comprised of:
   about 5% to about 80% by weight total solids in a solvent, said solids containing
      (1) about ½% to about 65% by weight fluorocarbon polymer in finely divided form,
      (2) about 5% to about 95% by weight conductor particles substantially of silver in finely divided form, and
      (3) about 3% to about 90% binder, said binder being selected from the group consisting of a thermosetting resin or a thermoplastic resin, said resin being different from said polymer.

11. The composition of claim 10 wherein
said fluorocarbon polymer is present from about 1½% to about 40% by weight of total solids,
said conductor particles are present from about 10% to about 60% by weight of total solids, and
said binder resin is present from about 5% to about 40% by weight of total solids.

12. The composition of claim 10 wherein said binder is a thermosetting resin.

13. The composition of claim 10 wherein said binder is a phenolic resin.

14. The composition of claim 10 wherein said fluorocarbon polymer has a particle size of minus 325 mesh, and said conductor particles have a particle size of minus 100 mesh.

15. The composition of claim 11 wherein said total solids present in the composition is within the range of about 25% to about 65%.

16. The composition of claim 10, wherein said fluorocarbon polymer is polytetrafluoroethylene.

17. A pressurized container containing aerosol composition for use in forming electrically conductive, high lubricity, fluorocarbon polymer containing, wear resistant, adherent surface coatings, said composition consisting essentially of:
   a part (I) including a composition comprised of about 5% to about 80% by weight total solids in a solvent, said solids containing
   (1) about ½% to about 65% by weight fluorocarbon polymer in finely divided form,
   (2) about 5% to about 95% by weight conductor particles substantially of silver in finely divided form, and
   (3) about 3% to about 90% binder, said binder being selected from the group consisting of a thermosetting resin or a thermoplastic resin, said resin being different from said polymer, and
a part (II) constituting
   a propellant material for aerosolizing the aerosol composition,
      said part (I) and part (II) together containing total solids of said fluorocarbon polymer, said conductor particles, and said binder in the range of about ⅕% to about 25% by weight.

18. The container of claim 17 wherein
said fluorocarbon polymer is polytetrafluoroethylene having a particle size less than about 10 microns,
said binder is a phenolic resin, and
said conductor particles have a particle size of minus 325 mesh.

19. A method of forming an electrically conductive, high lubricity, fluorocarbon polymer containing, wear resistant, adherent coating on a substrate, comprising the steps of:
(A) spraying on the substrate an aerosol composition consisting essentially of:
   a part (I) including a composition comprised of about 5% to about 80% by weight total solids in a solvent, said solids containing
      (1) about ½% to about 65% by weight fluorocarbon polymer in finely divided form,
      (2) about 5% to about 95% by weight conductor particles substantially of silver in finely divided form, and
      (3) about 3% to about 90% binder, said binder being selected from the group consisting of a thermosetting resin or a thermoplastic resin, said resin being different from said polymer, and
   a part (II) constituting a propellant material for aerosolizing the aerosol composition,
      said part (I) and part (II) together containing total solids of said fluorocarbon polymer, said conductor particles, and said binder in the range of about ⅕% to about 25% by weight, and
(B) drying said composition to form an adherent coating on the substrate.

References Cited

UNITED STATES PATENTS

| | | | |
|---|---|---|---|
| 3,005,795 | 10/1961 | Busse et al. | 260—900 |
| 3,056,750 | 10/1962 | Pass | 252—511 |
| 3,287,288 | 11/1966 | Reiling | 260—900 |
| 3,412,043 | 11/1968 | Gilliland | 252—514 |
| 3,453,208 | 7/1969 | Gallagher et al. | 260—900 |

DOUGLAS J. DRUMMOND, Primary Examiner

U.S. Cl. X.R.

117—227; 260—37, 41

UNITED STATES PATENT OFFICE
CERTIFICATE OF CORRECTION

Patent No. 3,573,230          Dated March 30, 1971

Inventor(s) Alexander J. Van Voorhees

It is certified that error appears in the above-identified patent and that said Letters Patent are hereby corrected as shown below:

Column 1, line 37, "2,954,476" should read -- 2,964,476 - line 58, "is" should read -- it --. Column 7, line 39, "hydracorbons" should read -- hydrocarbons --; Example 2, under column entitled Fluorocarbon polymer, "(Vydax-AR" should read -- (Vydax-AR) --. Example 9, under column entitled Binder resin solids, "3,7" should read -- 3. 7 --.

Signed and sealed this 7th day of September 1971.

(SEAL)
Attest:

EDWARD M. FLETCHER, JR.
Attesting Officer

ROBERT GOTTSCHALK
Acting Commissioner of Pate